United States Patent
Lin

(10) Patent No.: US 9,695,855 B2
(45) Date of Patent: Jul. 4, 2017

(54) BUILDING BLOCK STRUCTURE

(71) Applicant: Fang Yi Lin, Taichung (TW)

(72) Inventor: Fang Yi Lin, Taichung (TW)

( * ) Notice: Subject to any disclaimer, the term of this patent is extended or adjusted under 35 U.S.C. 154(b) by 49 days.

(21) Appl. No.: 14/882,468

(22) Filed: Oct. 14, 2015

(65) Prior Publication Data

US 2016/0115982 A1 Apr. 28, 2016

(30) Foreign Application Priority Data

Oct. 22, 2014 (TW) .............................. 103136403 A

(51) Int. Cl.
*F16B 7/06* (2006.01)
*F16B 25/00* (2006.01)
(Continued)

(52) U.S. Cl.
CPC ............ *F16B 7/06* (2013.01); *A63H 33/106* (2013.01); *F16B 5/0275* (2013.01); *F16B 9/026* (2013.01);
(Continued)

(58) Field of Classification Search
CPC .............. F16B 25/0057; F16B 25/0063; F16B 25/0068; F16B 25/0073; F16B 25/0052; F16B 25/0015; F16B 5/0275; F16B 9/026; F16B 33/02; F16B 2033/025; F16B 7/06; A63H 33/106; A63H 33/086; A63H 33/08; A63H 33/062; A63H 33/04; A63H 2003/00921; A63H 2009/1292; Y10T 403/29; Y10T 403/32598; Y10T 403/32204; Y10T 403/299; Y10T 403/32631; Y10T 403/3986

USPC ......... 446/69, 124, 125, 126, 127, 128, 120, 446/121, 122, 123, 489; 411/413, 412, 411/245, 932, 288, 389, 432, 5; 403/43, 403/48, 77, 118, 200, 299
See application file for complete search history.

(56) References Cited

U.S. PATENT DOCUMENTS

| 244,510 A | * | 7/1881 | Abernathy | F16B 39/12 411/223 |
| 2,059,175 A | * | 10/1936 | Myracle | E21B 17/06 285/3 |

(Continued)

*Primary Examiner* — Joshua J Michener
*Assistant Examiner* — Matthew Gitlin
(74) *Attorney, Agent, or Firm* — Leong C. Lei

(57) ABSTRACT

A building block structure includes a joint adaptor unit and at least one connection bar. The joint adaptor unit includes one or multiple joint adaptors, each of which includes at least one screwing connection end that includes a right/left-hand combined threaded hole formed therein. The right/left-hand combined threaded hole includes multiple right-handed screw troughs and multiple left-handed screw troughs that are alternately arranged. The connection bar has one end having multiple spaced right-handed external threads and an opposite end having multiple spaced left-handed external threads. As such, when the connection bar is rotated in a given direction, the right-handed external threads and the left-handed external threads are simultaneously screwed into the right/left-hand combined threaded holes of two oppositely facing joint adaptors. Through rotation in an opposite direction, the right-handed external threads and the left-handed external threads are simultaneously disengaged from the right/left-hand combined threaded holes.

17 Claims, 12 Drawing Sheets

(51) Int. Cl.
*F16B 5/02* (2006.01)
*F16B 9/02* (2006.01)
*A63H 33/10* (2006.01)

(52) U.S. Cl.
CPC ...... *F16B 25/0057* (2013.01); *F16B 25/0063* (2013.01); *F16B 25/0068* (2013.01); *Y10T 403/29* (2015.01)

(56) References Cited

U.S. PATENT DOCUMENTS

| | | | | |
|---|---|---|---|---|
| 2,251,031 A * | 7/1941 | Bozeman, Jr. | ............ | D01H 5/74 403/26 |
| 2,445,602 A * | 7/1948 | Casaroll | ................. | F02D 25/02 411/412 |
| 2,517,959 A * | 8/1950 | Baldwin | ............... | E04F 11/181 256/21 |
| 2,947,680 A * | 8/1960 | Preiser | .................... | C23F 13/10 204/196.18 |
| 3,854,350 A * | 12/1974 | Bauer | .................... | B21H 3/025 72/469 |
| 3,858,479 A * | 1/1975 | Sekhon | ............... | F16B 19/1054 411/34 |
| 4,729,707 A * | 3/1988 | Takahashi | ............. | F16B 35/042 403/45 |
| 5,385,420 A * | 1/1995 | Newman, Sr. | ........... | B25G 3/04 15/145 |
| 6,328,499 B1 * | 12/2001 | Reding | ................... | E04C 5/125 403/299 |
| 6,341,917 B1 * | 1/2002 | Schubring | ............ | F16B 5/0275 403/296 |
| 8,132,979 B2 * | 3/2012 | Orava | ................... | E04B 1/0023 285/125.1 |
| 8,292,243 B2 * | 10/2012 | Shaffer | .................... | B30B 1/18 248/222.14 |
| 9,239,073 B2 * | 1/2016 | Taneichi | ............. | F16B 39/282 |
| 2009/0232588 A1 * | 9/2009 | Goh | ........................ | F16B 2/065 403/44 |
| 2011/0182656 A1 * | 7/2011 | Babb | ...................... | B08B 9/043 403/265 |
| 2011/0262245 A1 * | 10/2011 | Michiwaki | ........... | F16B 33/006 411/412 |
| 2013/0078034 A1 * | 3/2013 | Kapelonis | ............ | A63H 33/067 403/343 |
| 2014/0308092 A1 * | 10/2014 | Hiroshi | ................. | F16B 1/0071 411/436 |
| 2015/0308487 A1 * | 10/2015 | Michiwaki | ........... | F16B 33/006 411/288 |

* cited by examiner

BUILDING BLOCK STRUCTURE

TECHNICAL FIELD OF THE INVENTION

The present invention relates generally to building blocks, and more particularly to a building block structure that allows for connection through screwing.

DESCRIPTION OF THE PRIOR ART

Building blocks are a toy that helps improve coordination among the brain, hands, and eyes of a player. Playing and assembling building blocks involve diverse variations, making it particularly suitable for training and improving the development of creativity of the player.

Numerous types of blocks are available in the market, of which some are blocks that are stackable blocks having variable geometric shapes, or alternatively, each of the blocks is provided with recessed sections and projecting sections for fitting and engaging with each other to connect the blocks. However, such blocks suffer insufficient strength in the connection of the blocks, leading to easy collapse and detachment and thus hard to make an expanded structure of assembly of blocks.

In addition, assembling or disassembling the known building blocks must be conducted in a piece by piece manner. This is time- and labor-consuming and causes a problem of being incapable of efficient assembly and disassembly.

SUMMARY OF THE INVENTION

In view of the above, to overcome the drawbacks of the prior art that the known building blocks suffer insufficiency of structural strength, easy collapse and detachment, and being time- and labor-consuming and thus inefficient for assembly and disassembly, the present invention aims to provide a building block structure, which generally comprises a joint adaptor unit and at least one connection bar. The joint adaptor unit comprises one or multiple joint adaptors, each of which comprises at least one screwing connection end that comprises a right/left-hand combined threaded hole formed therein. The right/left-hand combined threaded hole comprises one or multiple right-handed screw troughs and one or multiple left-handed screw troughs that are alternately arranged. The connection bar has one end having one or multiple spaced right-handed external threads and an opposite end having one or multiple spaced left-handed external threads. As such, when the connection bar is rotated in a given direction, the right-handed external threads and the left-handed external threads are simultaneously screwed into the right/left-hand combined threaded holes of two oppositely facing joint adaptors. Through rotation in an opposite direction, the right-handed external threads and the left-handed external threads are simultaneously disengaged from the right/left-hand combined threaded holes. As such, an intelligent assembly can be achieved with improved coupling strength and allowing for efficient assembly and disassembly to provide advantages of saving labor and saving time.

Since the threaded holes of the screwing connection ends of the joint adaptors of the joint adaptor unit are each provided with both right-handed screw troughs and left-handed screw troughs, during the manufacturing of the joint adaptors of the joint adaptor unit, there is no need to distinguish two different types of joint adaptor unit respectively for right-handed screwing and left-handed screwing so that the manufacture of molds can be reduced and inventory pressure of manufacturing and warehousing can also be reduced. Further, this allows a user, when using the present invention, not to select a specific form of joint adaptors, and enabling arbitrary coupling with the right-handed external threads or the left-handed external threads of any one end of a connection bar.

Since the external threads of the two ends of the connection bar are respectively composed of a plurality of right-handed external threads and left-handed external threads, this, when used in combination with joint adaptors that each comprise a right/left-hand combined threaded hole composed of a plurality of right-handed screw troughs and a plurality of left-handed screw troughs alternately arranged, would allow the two ends of the connection bar to easily match, engage, and screw into a screw start point of the threaded hole of each of the joint adaptors and efficient fastening can be achieved by moving through an extremely short screwing distance to reach a predetermined fastening position, this being helpful for increasing the speed of assembly and disassembly.

The foregoing objectives and summary provide only a brief introduction to the present invention. To fully appreciate these and other objects of the present invention as well as the invention itself, all of which will become apparent to those skilled in the art, the following detailed description of the invention and the claims should be read in conjunction with the accompanying drawings. Throughout the specification and drawings identical reference numerals refer to identical or similar parts.

Many other advantages and features of the present invention will become manifest to those versed in the art upon making reference to the detailed description and the accompanying sheets of drawings in which a preferred structural embodiment incorporating the principles of the present invention is shown by way of illustrative example.

DETAILED DESCRIPTION OF THE PREFERRED EMBODIMENTS

The following descriptions are exemplary embodiments only, and are not intended to limit the scope, applicability or configuration of the invention in any way. Rather, the following description provides a convenient illustration for implementing exemplary embodiments of the invention. Various changes to the described embodiments may be made in the function and arrangement of the elements described without departing from the scope of the invention as set forth in the appended claims.

Referring to FIGS. 1-8, a building block structure according a preferred embodiment of the present invention generally comprises a plurality of joint adaptors 40 and at least one the connection bar 30.

Figure 1:
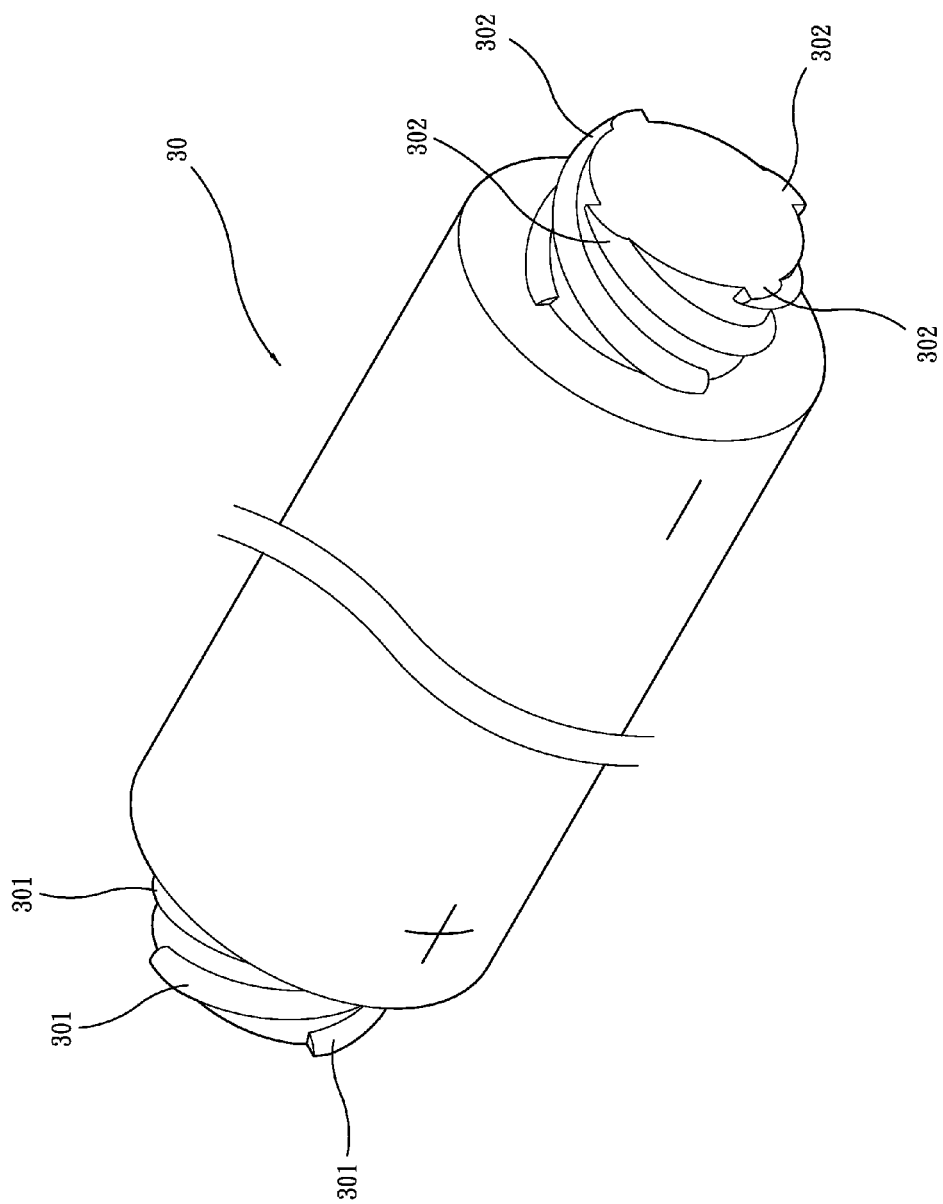
FIG. 1 is a perspective view showing a component (a connection bar) of a preferred embodiment of the present invention.
Figure 2:
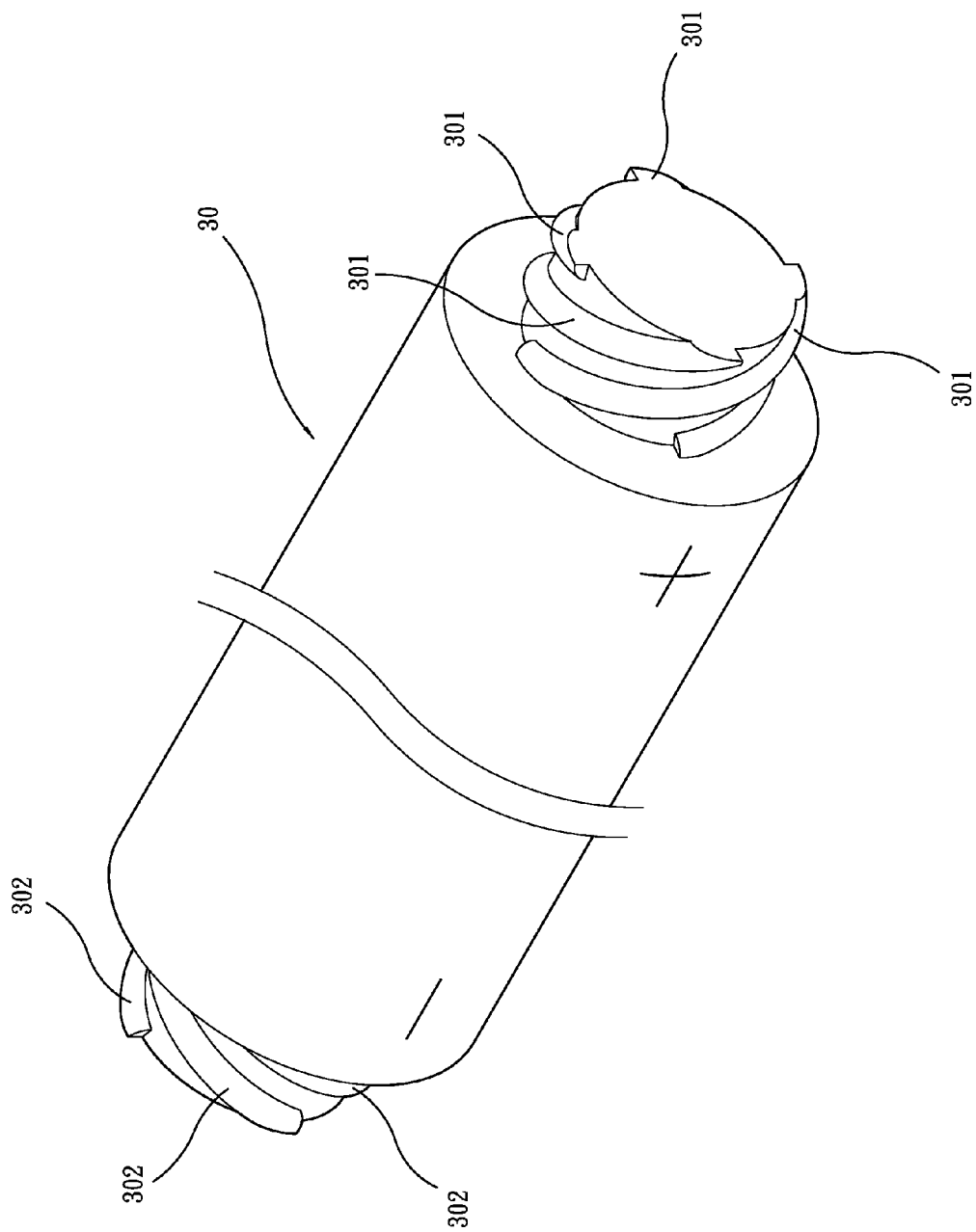
FIG. 2 is a perspective view showing a component (a connection bar) of a preferred embodiment of the present invention.
Figure 3:
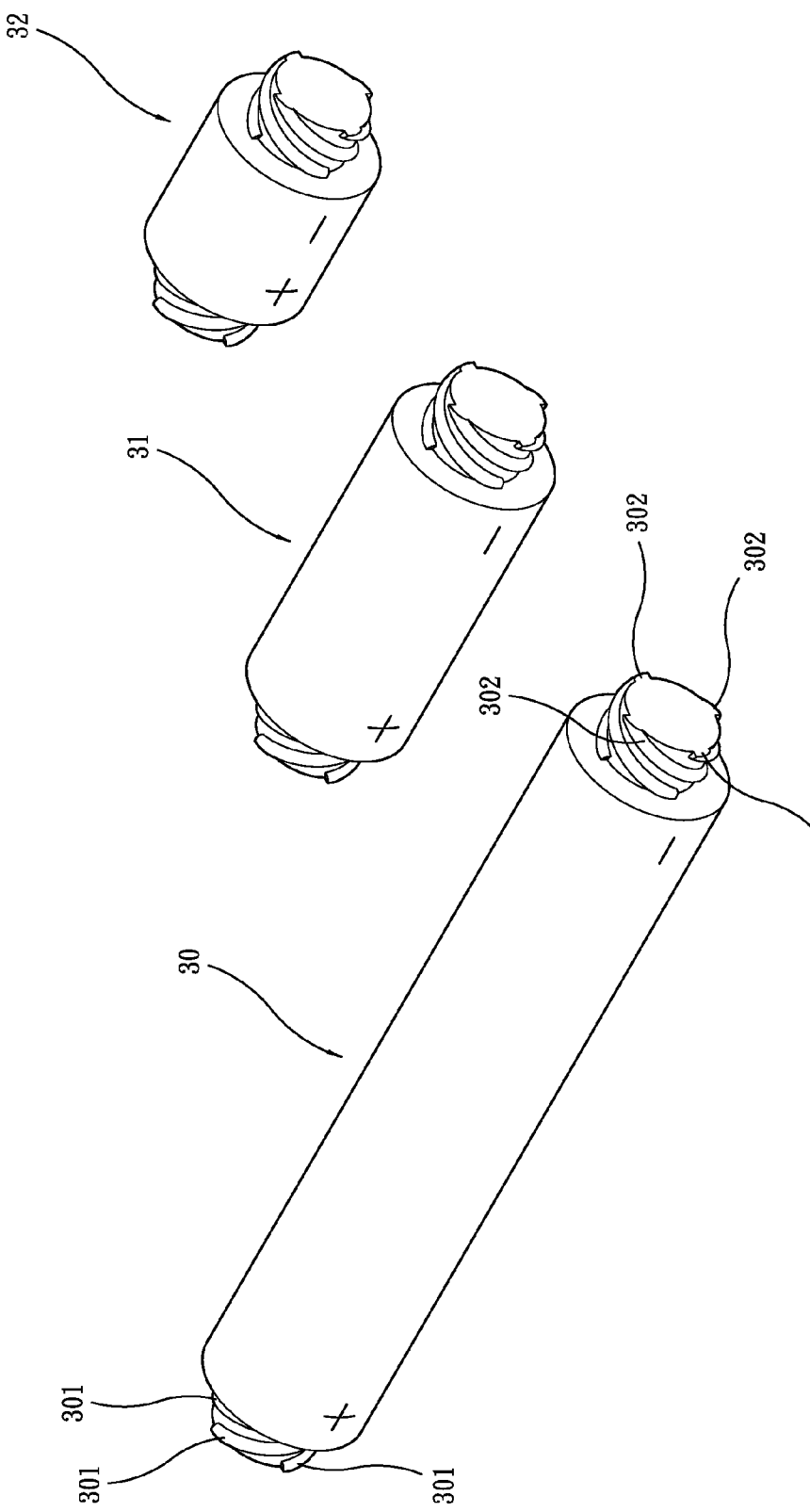
FIG. 3 is a perspective view showing components (connection bars) of a preferred embodiment of the present invention.

Referring to FIGS. 1-3, the connection bar 30, 31, 32 can be arranged to have different lengths according to the need for assembly and has two ends having a reduced diameter, wherein one of the ends comprises four right-handed external screw ridges or threads 301, which are spaced from each other, formed thereon and also includes a "+" mark provided on a circumferential surface of the connection bar 30 at a location proximal to the right-handed external screw ridges 301 for identification purposes, while the other one of the ends comprises four left-handed external screw ridges or threads 302, which are spaced from each other, formed thereon and also includes a "−" mark provided on the circumferential surface of the connection bar 30 at a location proximal to the left-handed external screw ridges 302 for identification purposes. Each of the right-handed external screw ridges 301 and the left-handed external screw ridges 302 has a helical length that is greater than or substantially equal to the length of semi-circumference.

Figure 4:
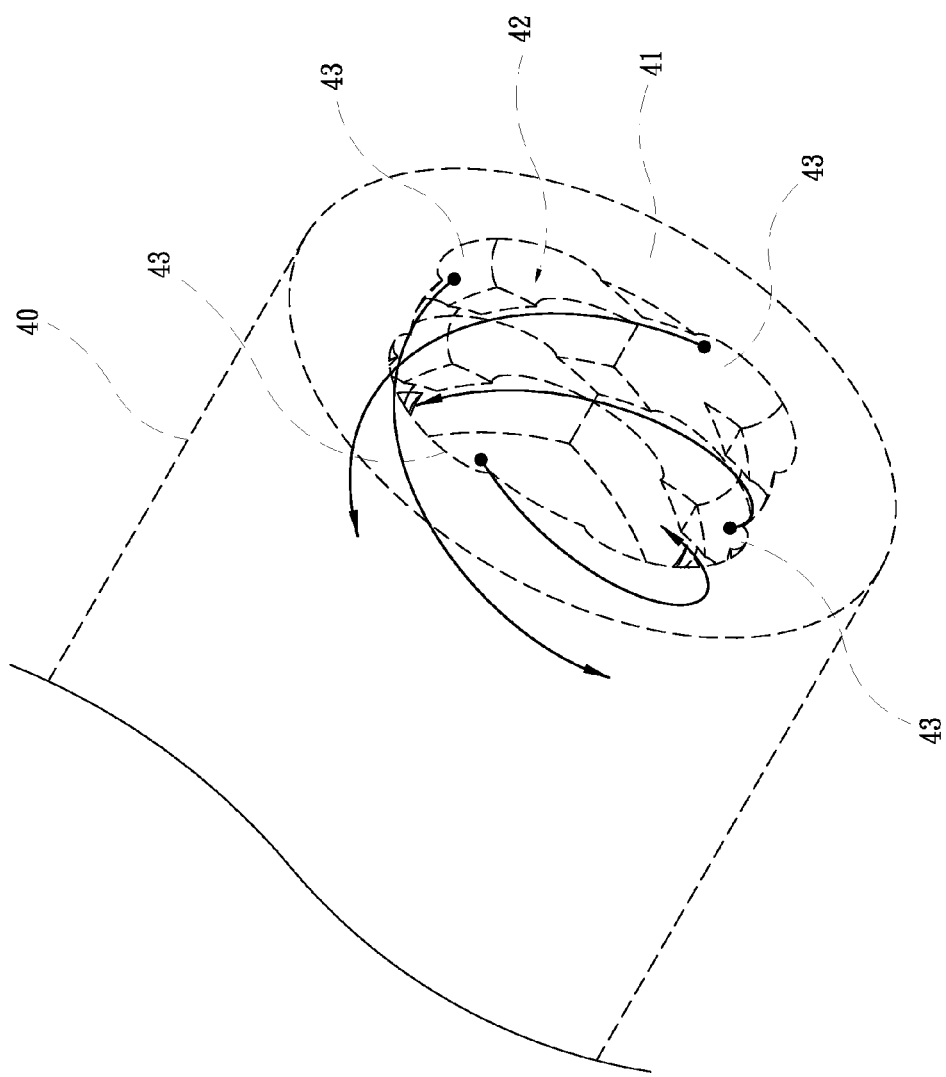
FIG. 4 is a perspective view showing a component (a joint adaptor) of a preferred embodiment of the present invention.
Figure 5:
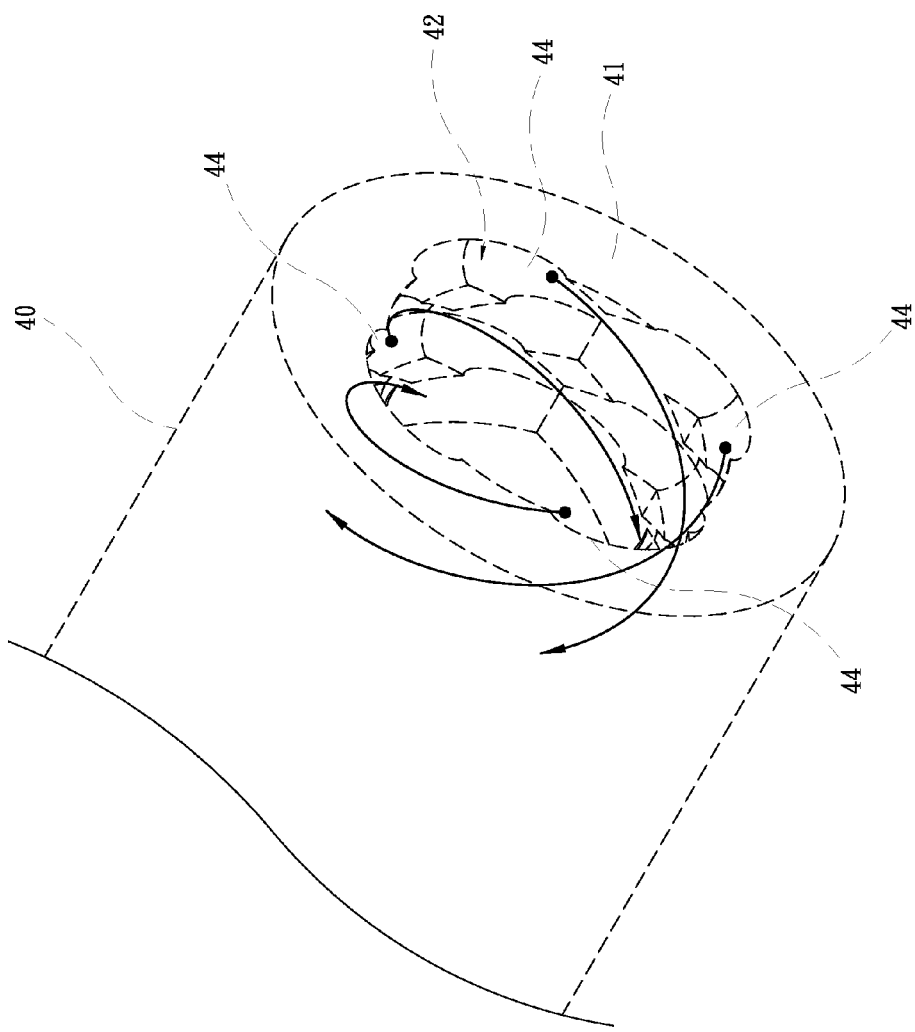
FIG. 5 is a perspective view showing a component (a joint adaptor) of a preferred embodiment of the present invention.
Figure 6:
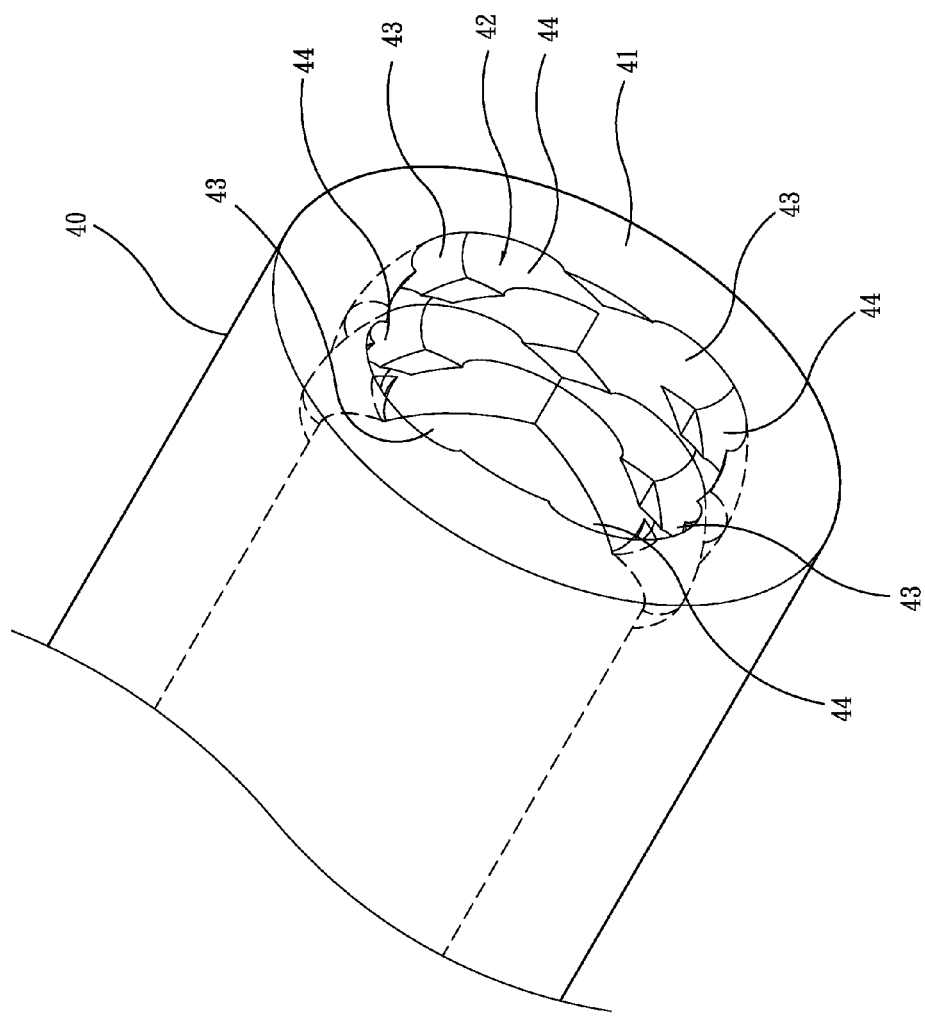
FIG. 6 is a perspective view showing a component (a joint adaptor) of a preferred embodiment of the present invention.

Further referring to FIGS. 4-6, the joint adaptor 40 comprises at least a screwing connection end 41. The screwing connection end 41 comprises a right/left-hand combined threaded hole 42 formed therein. The right/left-hand combined threaded hole 42 is formed by alternate arranging four right-handed screw troughs 43 and four left-handed screw troughs 44. Each of the right-handed screw troughs 43 and the left-handed screw troughs 44 has a helical length greater than or substantially equal to the length of a semi-circumferential length of the right/left handed combined threaded hole 42. An opposite end of the joint adaptor 40 can be provided with a shape or structure of a different configuration according to the need of assembly.

Figure 7:
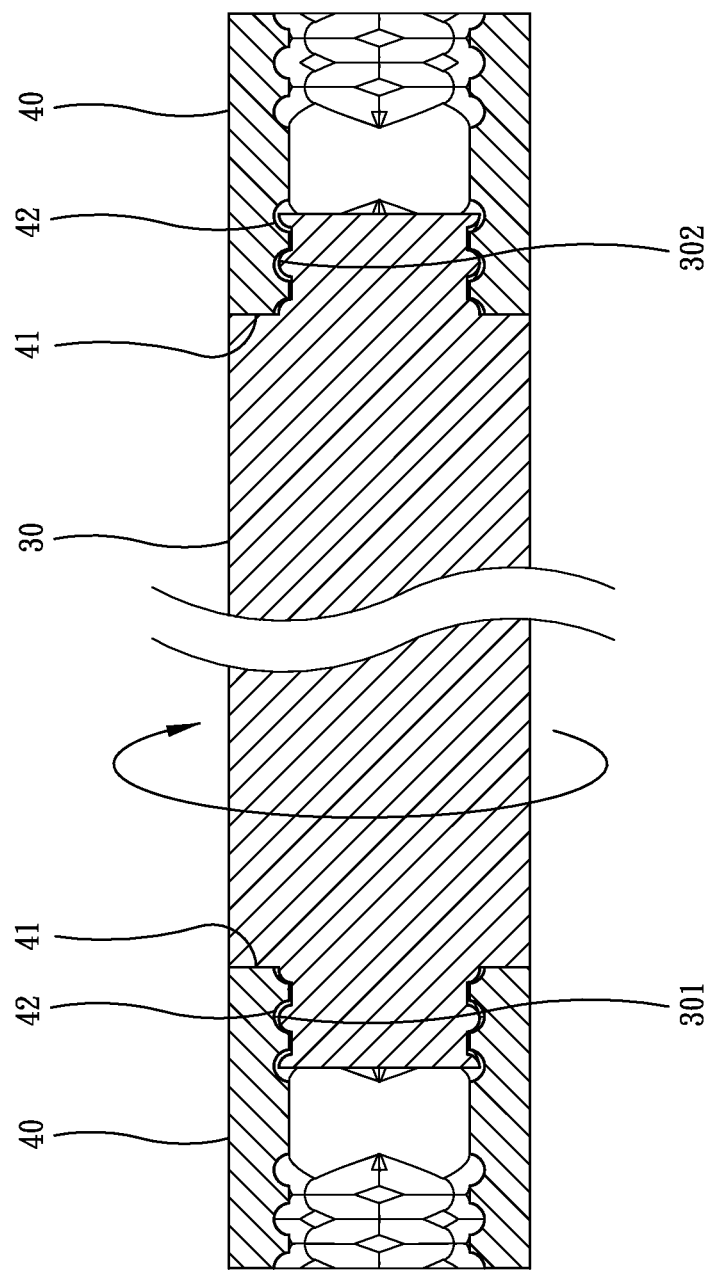
FIG. 7 is a cross-sectional view of a preferred embodiment of the present invention in a condition of use (for illustrating screwed connection between a connection bar and joint adaptors).
Figure 8:
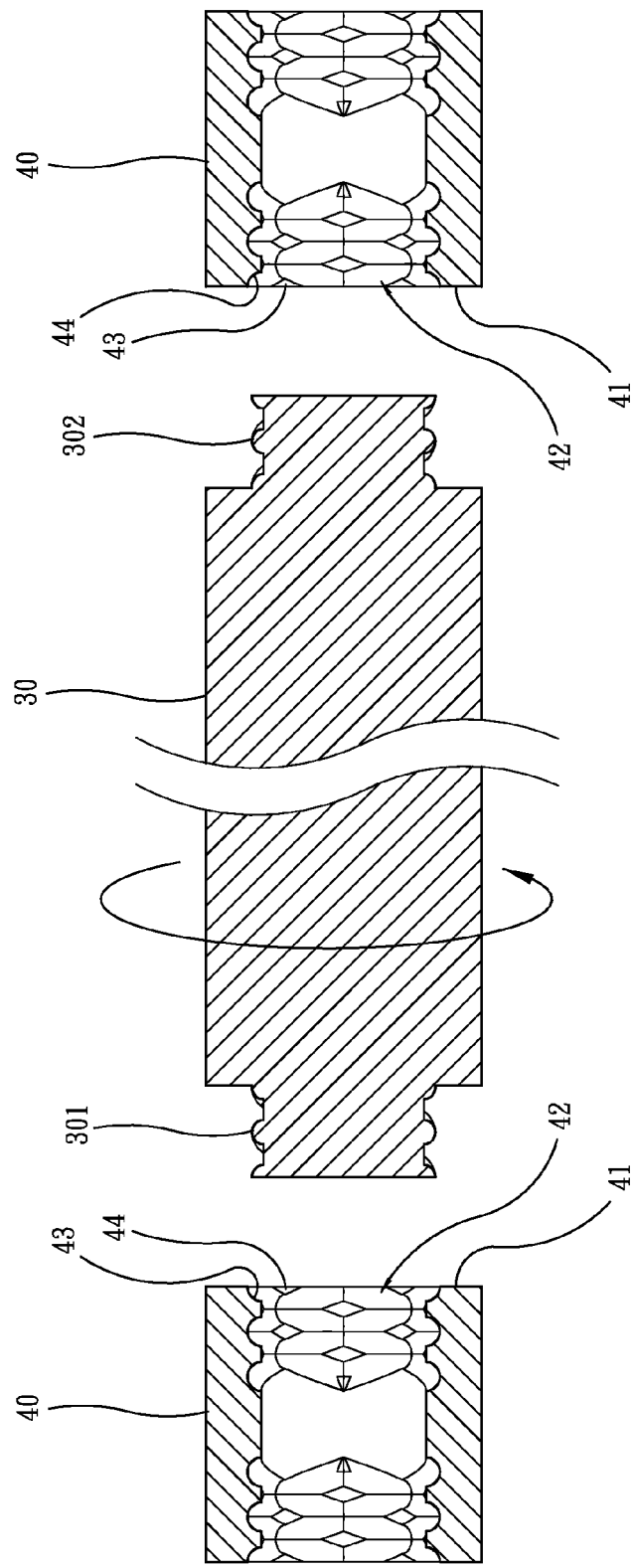
FIG. 8 is a cross-sectional view of a preferred embodiment of the present invention in a condition of use (for illustrating separation of a connection bar from joint adaptors).

Further referring to FIGS. 7 and 8, the features of the present invention will be described. Each of the joint adaptors 40 has a screwing connection end 41 and each screwing connection end 41 comprises a right/left-hand combined threaded hole 42 formed therein. For two joint adaptors 40 that face each other, a connection bar 30 can be arranged therebetween with two ends respectively having right-handed external threads 301 and left-handed external threads 302 screwed into and engaging with the right/left-hand combined threaded hole 42 of the respective joint adaptors 40. Since the right/left-hand combined threaded hole 42 of each of the joint adaptors 40 possesses both right-handed screw troughs 43 the left-handed screw troughs 44, regardless whether a right-handed external thread 301 or a left-handed external thread 302 is provided, the connection bar 30 is screwable into and engageable with the right/left-hand combined threaded hole. As shown in FIG. 7, when the connection bar 30 is rotated in a given rotational direction, the right-handed external threads 301 and the left-handed external threads 302 that are respectively formed on the two ends of the connection bar 40 can be simultaneously screwed into the right/left-hand combined threaded holes 42 of the two oppositely-facing joint adaptors 40 and get tightly fastened together, or can be rotated in an opposite direction to have the right-handed external threads 301 and the left-handed external threads 302 of the two ends of the connection bar 30 simultaneously disengaging and separated from the right/left-hand combined threaded holes 42 of the two joint adaptors 40, whereby an effect of fast assembly/disassembly and time and labor saving can be achieved. Further, since the connection made according to the present invention is achieved with screwed coupling between a threaded hole and an external thread, the structural strength after coupling is high, making it not easy to separate and collapse and thus, a large-sized structure can be form through assembly. Further, since the external threads of the two ends of the connection bar 30 are respectively composed of a plurality of right-handed external threads 301 and left-handed external threads 302, this, when used in combination with joint adaptors 40 that each comprise a right/left-hand combined threaded hole 42 composed of a plurality of right-handed screw troughs 43 and a plurality of left-handed screw troughs 44 alternately arranged, would allow the two ends of the connection bar 30 to easily match, engage, and screw into a screw start point of the right/left-hand combined threaded hole 42 of each of the joint adaptors 40 and efficient fastening can be achieved by moving through an extremely short screwing distance to reach a predetermined fastening position, this being helpful for increasing the speed of assembly and disassembly.

Figure 9:
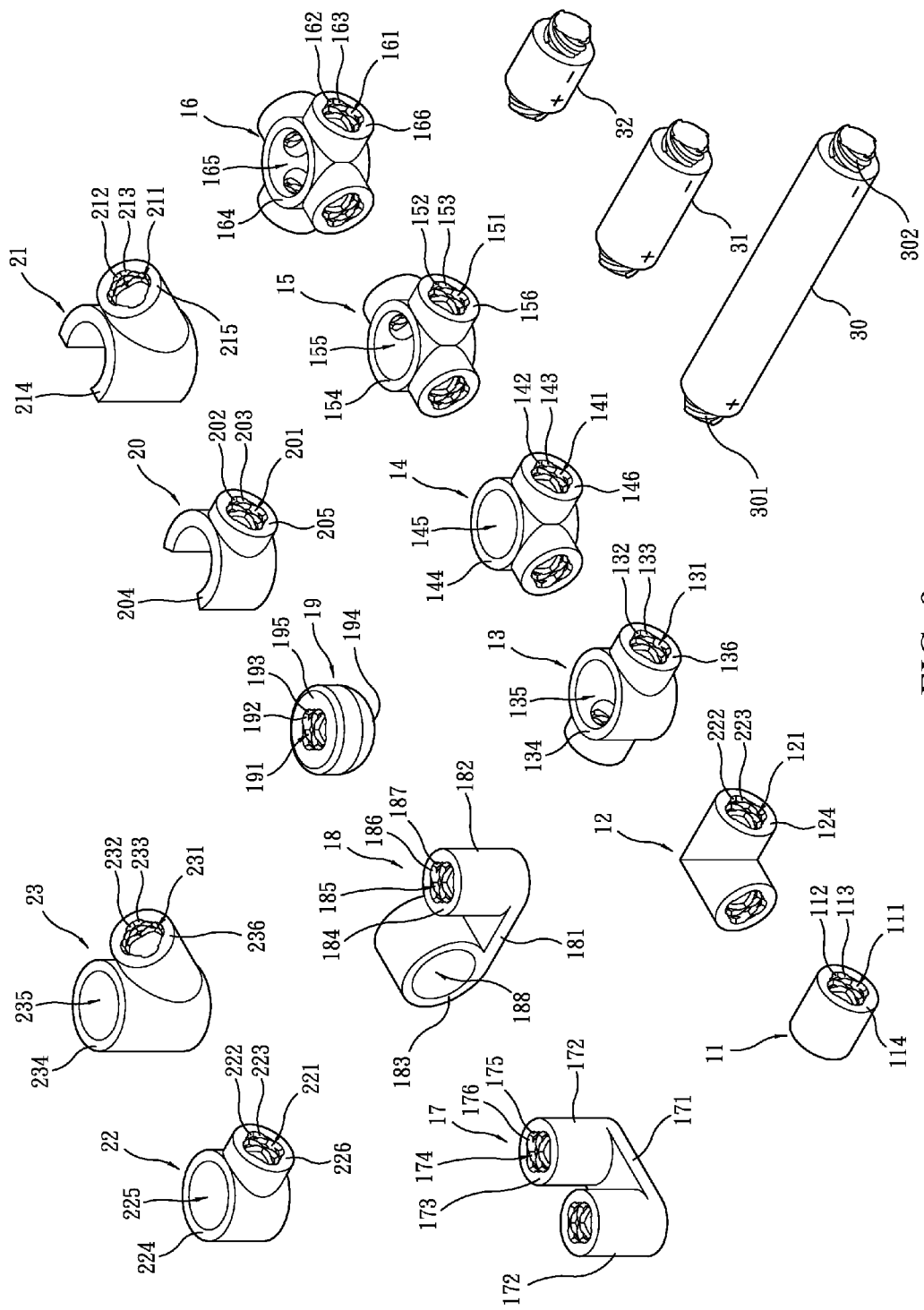
FIG. 9 is a schematic view illustrating examples of various forms of joint adaptors according to the present invention.

Further referring to FIG. 9, various modified examples of the joint adaptor according to the present invention are illustrated, including a coaxial two-end joint adaptor 11, a right-angled two-end joint adaptor 12, a tube-attached coaxial two-end joint adaptor 13, a tube-attached right-angled two-end joint adaptor 14, a tube-attached T-shaped three-end joint adaptor 15, a tube-attached cruciform four-end joint adaptor 16, a conjoint parallel four-end joint adaptor 17, a direction-changed tube-conjoined two-end joint adaptor 18, a plug-form one-end joint adaptor 19, a right-angled C-clip one-end joint adaptor 20, an inclined C-clip one-end joint adaptor 21, a tube-attached right-angled one-end joint adaptor 22, and a tube-attached inclined one-end joint adaptor 23.

The coaxial two-end joint adaptor 11 comprises a tubular body having a bore extending through both ends. Each of the ends forms a screwing connection end 114. Each of the screwing connection ends 114 comprises a right/left-hand combined threaded hole 111. Each of the right/left-hand combined threaded holes 111 is composed of four right-handed screw troughs 112 and four left-handed screw troughs 113 that are alternately arranged.

The right-angled two-end joint adaptor 12 comprises tubular bodies jointed to each other at a right angle. Each of the tubular bodies comprises a screwing connection end 124. Each of the screwing connection ends 124 comprises a right/left-hand combined threaded hole 121. Each of the right/left-hand combined threaded holes 121 is composed of four right-handed screw troughs 122 and four left-handed screw troughs 123 that are alternately arranged.

The tube-attached coaxial two-end joint adaptor 13 comprises a tube 134 that has a through bore 135 and an outer circumferential surface having opposite sides to each of which a screwing connection end 136 is formed. Each of the screwing connection ends 136 comprises a right/left-hand combined threaded hole 131. Each of the right/left-hand combined threaded holes 131 is composed of four right-handed screw troughs 132 and four left-handed screw troughs 133 that are alternately arranged.

The tube-attached right-angled two-end joint adaptor 14 comprises a tube 144 that has a through bore 145 and an outer circumferential surface having two sides that are spaced from each other by a right angle and each comprises a screwing connection end 146 mounted thereto. Each of the screwing connection ends 146 comprises a right/left-hand combined threaded hole 141. Each of the right/left-hand combined threaded holes 141 is composed of four right-handed screw troughs 142 and four left-handed screw troughs 143 that are alternately arranged.

The tube-attached T-shaped three-end joint adaptor 15 comprises a tube 154 that has a through bore 155 and an outer circumferential surface to which three screwing connection ends 156 are mounted. Each of the screwing connection ends 156 comprises a right/left-hand combined threaded hole 151. Each of the right/left-hand combined threaded holes 151 is composed of four right-handed screw troughs 152 and four left-handed screw troughs 153 that are alternately arranged.

The tube-attached cruciform four-end joint adaptor 16 comprises a tube 164 that has a through bore 165 and an outer circumferential surface to which four screwing connection ends 166 are mounted. The screwing connection ends 166 are arranged to define a right angle between adjacent ones thereof. Each of the screwing connection ends 166 comprises a right/left-hand combined threaded hole 161. Each of the right/left-hand combined threaded holes 161 is composed of four right-handed screw troughs 162 and four left-handed screw troughs 163 that are alternately arranged.

The conjoint parallel four-end joint adaptor 17 comprises a connection plate 171 having a surface on which two spaced and substantially parallel coaxial two-end joint adaptors 172 are mounted. Each of the coaxial two-end joint adaptors 172 has two ends each forming a screwing connection end 173. Each of the screwing connection ends 173 comprises a right/left-hand combined threaded hole 174. Each of the right/left-hand combined threaded holes 174 is composed of four right-handed screw troughs 175 and four left-handed screw troughs 176 that are alternately arranged.

The direction-changed tube-conjoined two-end joint adaptor 18 comprises a connection plate 181 having a surface on which a coaxial two-end joint adaptor 182 and a tube 183 are mounted. The coaxial two-end joint adaptor 182 has two ends each forming a screwing connection end 184. Each of the screwing connection ends 184 comprises a right/left-hand combined threaded hole 185. Each of the right/left-hand combined threaded holes 185 is composed of four right-handed screw troughs 186 and four left-handed screw troughs 187 that are alternately arranged. The tube 183 comprises a through bore 188 formed therein and extending through opposite ends thereof. The coaxial two-end joint adaptor 182 and the tube 183 are arranged to be substantially perpendicular to each other.

The plug-form one-end joint adaptor 19 has an end that forms a screwing connection end 195 and an opposite that is an arc-shaped closed end 194. The screwing connection end 195 comprises a right/left-hand combined threaded hole 191. The right/left-hand combined threaded hole 191 is composed of four right-handed screw troughs 192 and four left-handed screw troughs 193 that are alternately arranged.

The right-angled C-clip one-end joint adaptor 20 comprises a C-shaped clip 204 having a side surface on which a screwing connection end 205 is formed. The screwing connection end 205 comprises a right/left-hand combined threaded hole 201. The right/left-hand combined threaded hole 201 is composed of four right-handed screw troughs 202 and four left-handed screw troughs 203 that are alternately arranged. The C-shaped clip 204 and the screwing connection end 205 are arranged to be substantially perpendicular to each other.

The inclined C-clip one-end joint adaptor 21 comprises a C-shaped clip 214 having a side surface on which a screwing connection end 215 is formed. The screwing connection end 215 comprises a right/left-hand combined threaded hole 211. The right/left-hand combined threaded hole 211 is composed of four right-handed screw troughs 212 and four left-handed screw troughs 213 that are alternately arranged. The C-shaped clip 204 and the screwing connection end 205 are arranged to be inclined with respect to each other.

The tube-attached right-angled one-end joint adaptor 22 comprises a tube 224 that comprises a through bore 225 and an outer circumferential surface on which a screwing connection end 226 is formed. The screwing connection end 226 comprises a right/left-hand combined threaded hole 221. The right/left-hand combined threaded hole 221 is composed of four right-handed screw troughs 222 and four left-handed screw troughs 223 that are alternately arranged. The tube 224 and the screwing connection end 226 are arranged to be substantially perpendicular to each other.

The tube-attached inclined one-end joint adaptor 23 comprises a tube 234 that comprises a through bore 235 and an outer circumferential surface on which a screwing connection end 236 is formed. The screwing connection end 236 comprises a right/left-hand combined threaded hole 231. The right/left-hand combined threaded hole 231 is composed of four right-handed screw troughs 232 and four left-handed screw troughs 233 that are alternately arranged. The tube 234 and the screwing connection end 236 are arranged to be inclined with respect to each other.

Figure 10:
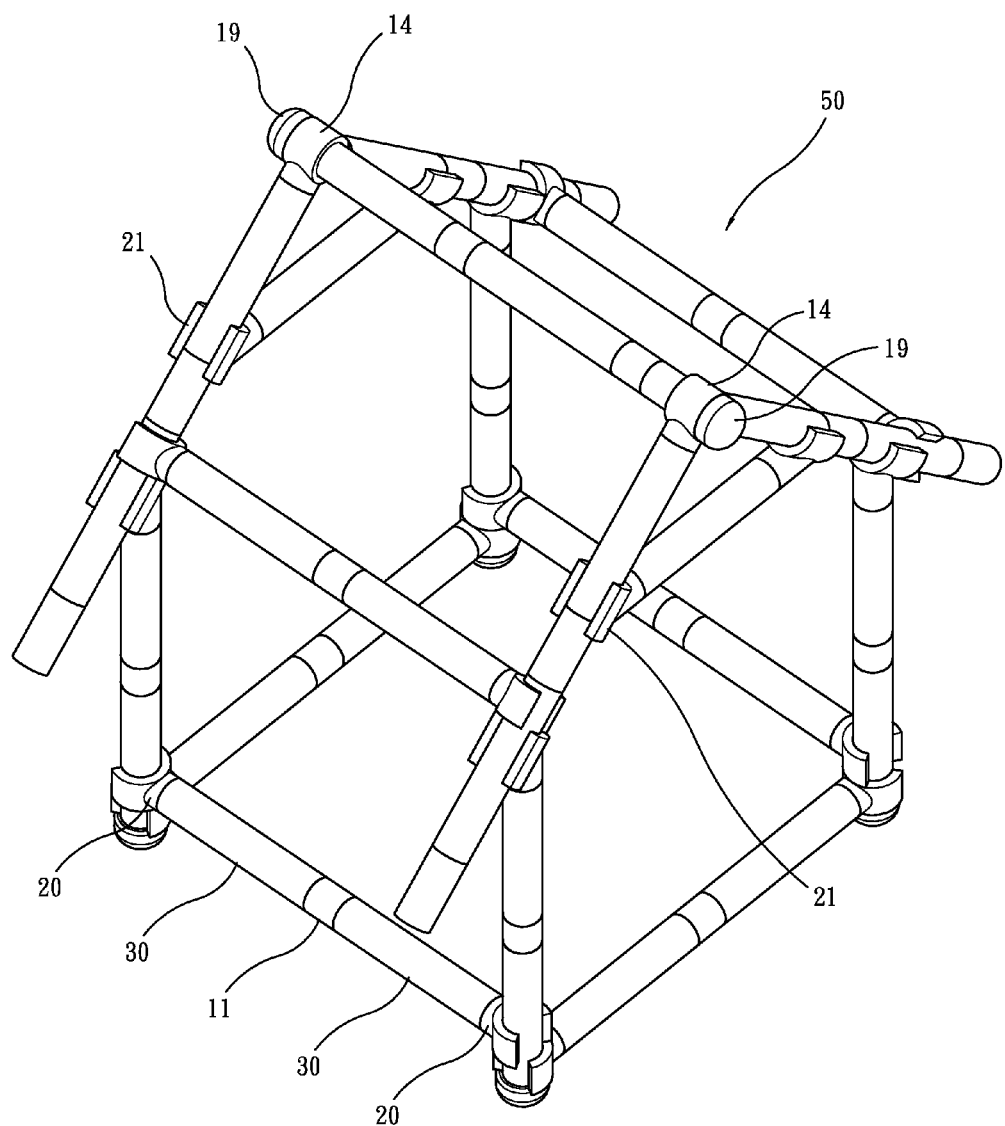
FIG. 10 is a perspective view illustrating a first work accomplished with a preferred embodiment of the present invention.
Figure 11:
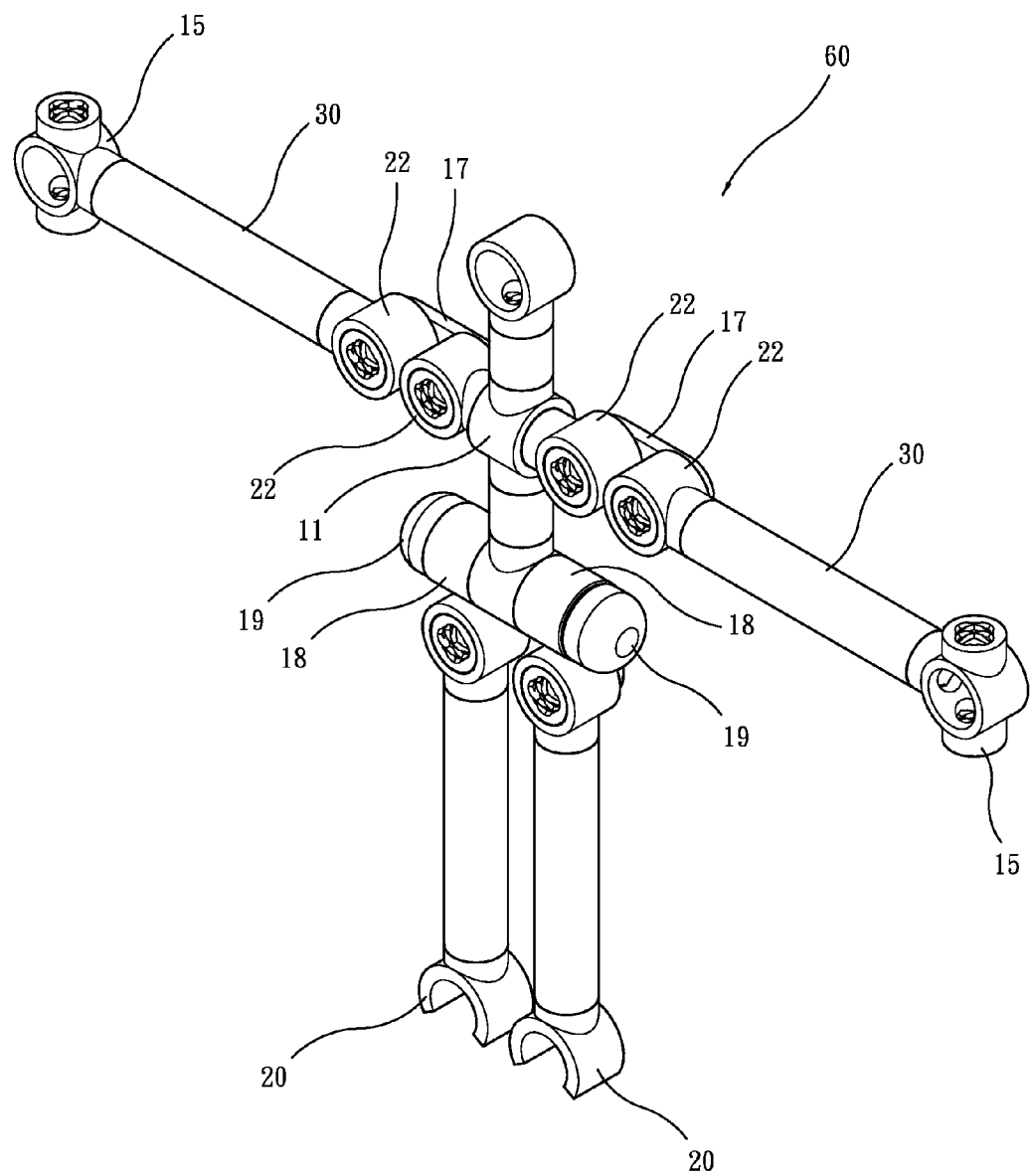
FIGS. 11 and 12 are perspective views illustrating a second work accomplished with a preferred embodiment of the present invention.
Figure 12:
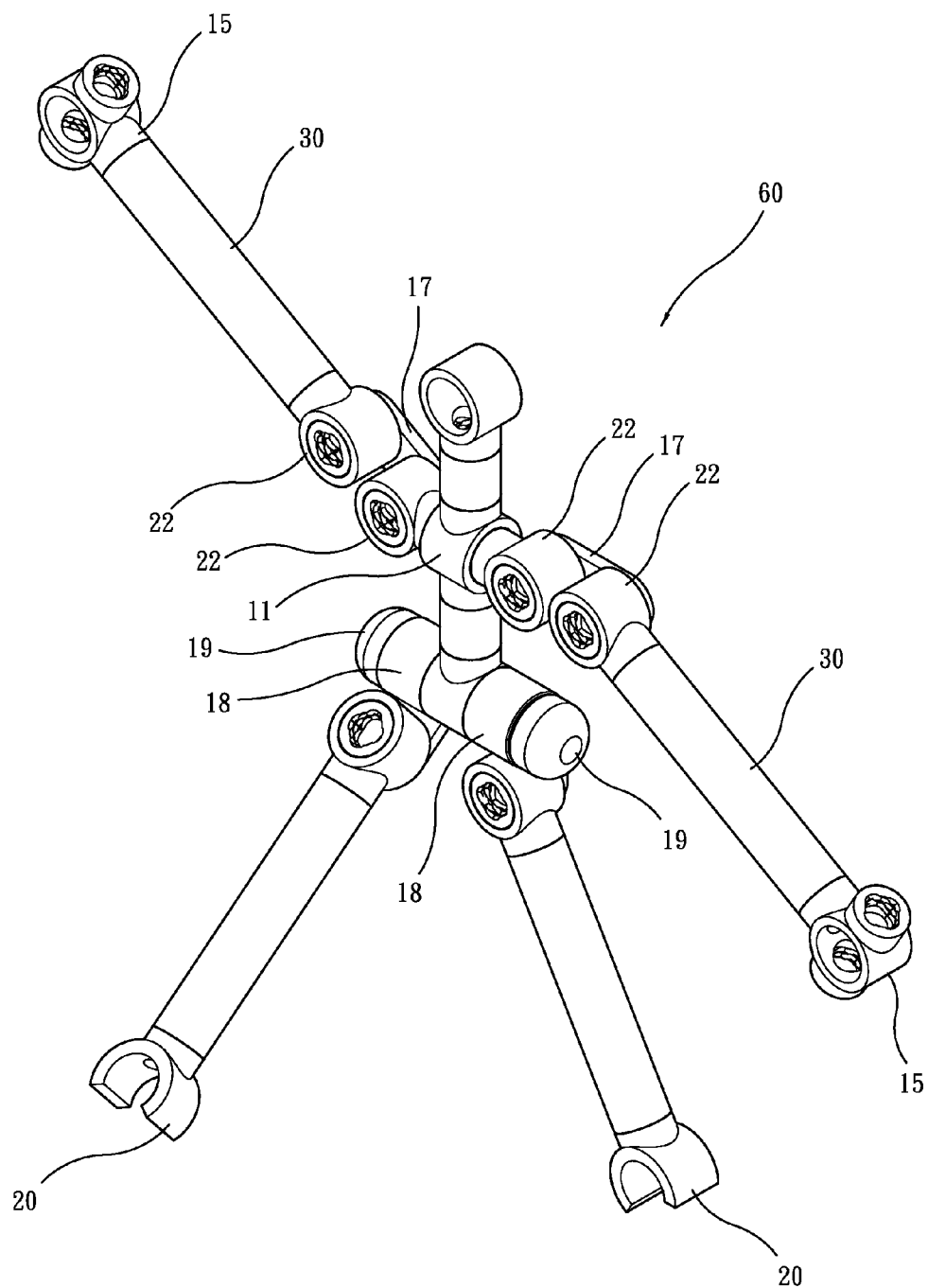

Referring to FIGS. 10-12, the various forms of the joint adaptors illustrated above, including the coaxial two-end joint adaptor 11, the right-angled two-end joint adaptor 12, the tube-attached coaxial two-end joint adaptor 13, the tube-attached right-angled two-end joint adaptor 14, the tube-attached T-shaped three-end joint adaptor 15, the tube-attached cruciform four-end joint adaptor 16, the conjoint parallel four-end joint adaptor 17, the direction-changed tube-conjoined two-end joint adaptor 18, the plug-form one-end joint adaptor 19, the right-angled C-clip one-end joint adaptor 20, the inclined C-clip one-end joint adaptor 21, the tube-attached right-angled one-end joint adaptor 22, and the tube-attached inclined one-end joint adaptor 23 each comprise one or more screwing connection ends and one or more right/left-hand combined threaded holes, which are arranged to have the specifications, wherein each of the right-handed screw troughs and left-handed screw troughs has a helical length that is greater than or substantially equal to the length of of a semi-circumferential length of the right/left-hand combined threaded hole. The various forms of the joint adaptor involves tubes and through bores that are of the same size specification and the size is slightly greater than that of the screwing connection end to allow another joint adaptor of the above-described forms to insert, with the screwing connection end therein, into the tube to form a pivotal jointing configuration, which is a structure allowing for relative rotation. It is noted here that the connection bars 30, 31 that have different lengths have an outside diameter that corresponds to an outside diameter of the screwing connection ends. Referring to FIG. 10, a number of coaxial two-end joint adaptors 11, tube-attached right-angled two-end joint adaptors 14, plug-form one-end joint adaptors 19, right-angled C-clip one-end joint adaptors 20, and inclined C-clip one-end joint adaptors 21 are used in combination with connection bars 30, 31 of different lengths to accomplish a first work 50. Referring to FIGS. 11 and 12, coaxial two-end joint adaptors 11, tube-attached T-shaped three-end joint adaptors 15, conjoint parallel four-end joint adaptors 17, direction-changed tube-conjoined two-end joint adaptors 18, plug-form one-end joint adaptors 19, right-angled C-clip one-end joint adaptors 20, and tube-attached right-angled one-end joint adaptors 22 are used in combination with a number of connection bars 30, 31 having different lengths to accomplish a second work 60, in which the conjoint parallel four-end joint adaptors 17, the direction-changed tube-conjoined two-end joint adaptors 18, and the tube-attached right-angled one-end joint adaptors 22 are used to provide rotatable joints so that the second work 60 may be adjusted, in a rotatable manner, to change the angles thereof.

It will be understood that each of the elements described above, or two or more together may also find a useful application in other types of methods differing from the type described above.

While certain novel features of this invention have been shown and described and are pointed out in the annexed claim, it is not intended to be limited to the details above, since it will be understood that various omissions, modifications, substitutions and changes in the forms and details of the device illustrated and in its operation can be made by those skilled in the art without departing in any way from the claims of the present invention.

I claim:

1. A building block structure, comprising a joint adaptor unit and at least one connection bar, the joint adaptor unit comprising at least one joint adaptor, the at least one joint adaptor comprising at least one screwing connection end, the at least one screwing connection end comprising a right/left-hand combined threaded hole formed therein, the right/left-hand combined threaded hole being formed by alternate arranging at least one right-handed screw trough and at least one left-handed screw trough, the connection bar having one end that comprises at least one spaced right-handed external thread and an opposite end that comprises at least one spaced left-handed external thread; wherein the joint adaptor unit further comprises at least one right-angled two-end joint adaptor, the at least one right-angled two-end joint adaptor comprising tubular bodies jointed to each other at a right angle, each of the tubular bodies comprising a screwing connection end having a right/left-hand combined threaded hole which comprises at least one right-handed screw trough and at least one left-handed screw trough that are alternately arranged.

2. The building block structure according to claim 1, wherein the connection bar has a middle portion that has an outside diameter that is substantially identical to an outside diameter of the screwing connection end of the at least one joint adaptor.

3. The building block structure according to claim 1, wherein each of the right-handed screw trough and left-handed screw trough has a helical length that is greater than or substantially equal to a length of a semi-circumferential length of the right/left-hand combined threaded hole and each of the right-handed external thread and left-handed external thread has a helical length that is greater than or substantially equal to a length of a semi-circumferential length of the right/left-hand combined threaded hole.

4. The building block structure according to claim 1, wherein the joint adaptor unit further comprises at least one tube-attached right-angled two-end joint adaptor, at least one plug-form one-end joint adaptor, at least one right-angled C-clip one-end joint adaptor, and at least one inclined C-clip one-end joint adaptor, wherein: the at least one tube-attached right-angled two-end joint adaptor comprises a tube that has a through bore and an outer circumferential surface having two sides that are spaced from each other by a right angle and each comprises a screwing connection end mounted thereto and having a right/left-hand combined threaded hole, the right/left-hand combined threaded hole comprising at least one right-handed screw trough and at least one left-handed screw trough that are alternately arranged; the plug-form one-end joint adaptor has an end that forms a screwing connection end and an opposite that is an arc-shaped closed end, the screwing connection end comprising a right/left-hand combined threaded hole, the right/left-hand combined threaded hole comprising at least one right-handed screw trough and at least one left-handed screw trough that are alternately arranged; the right-angled C-clip one-end joint adaptor comprises a C-shaped clip having a side surface on which a screwing connection end is formed, the screwing connection end comprising a right/left-hand combined threaded hole, the right/left-hand combined threaded hole comprising at least one right-handed screw and at least one e left-handed screw trough that are alternately arranged, the C-shaped clip and the screwing connection end being arranged to be substantially perpendicular to each other; and the inclined C-clip one-end joint adaptor comprises a C-shaped clip having a side surface on which a screwing connection end is formed, the screwing connection end comprising a right/left-hand combined threaded hole, the right/left-hand combined threaded hole comprising at least one right-handed screw trough and at least one left-handed screw trough that are alternately arranged, the C-shaped clip and the screwing connection end being arranged to be inclined with respect to each other.

5. The building block structure according to claim 1, wherein the joint adaptor unit further comprises at least one conjoint parallel four-end joint adaptor, at least one direction-changed tube-conjoined two-end joint adaptor, at least one plug-form one-end joint adaptor, and at least one tube-attached right-angled one-end joint adaptor, wherein: the conjoint parallel four-end joint adaptor comprises a connection plate having a surface on which two spaced and substantially parallel coaxial two-end joint adaptors are mounted, each of the coaxial two-end joint adaptors having two ends each forming a screwing connection end, the screwing connection end comprising a right/left-hand combined threaded hole, the right/left-hand combined threaded hole comprising at least one right-handed screw trough and at least one left-handed screw trough that are alternately arranged; the direction-changed tube-conjoined two-end joint adaptor comprises a connection plate having a surface on which a coaxial two-end joint adaptor and a tube are mounted, the coaxial two-end joint adaptor having two ends each forming a screwing connection end, the screwing connection comprising a right/left-hand combined threaded hole, the right/left-hand combined threaded hole comprising at least one right-handed screw trough and at least one left-handed screw trough that are alternately arranged, the tube comprising a through bore formed therein and extending through opposite ends thereof, the coaxial two-end joint adaptor and the tube being arranged to be substantially perpendicular to each other; the plug-form one-end joint adaptor has an end that forms a screwing connection end and an opposite that is an arc-shaped closed end, the screwing connection end comprising a right/left-hand combined threaded hole, the right/left-hand combined threaded hole comprising at least one right-handed screw trough and at least one left-handed screw trough that are alternately arranged; and the tube-attached right-angled one-end joint adaptor comprises a tube that comprises a through bore and an outer circumferential surface on which a screwing connection end is formed, the screwing connection end comprising a right/left-hand combined threaded hole, the right/left-hand combined threaded hole comprising at least one right-handed screw trough and at least one left-handed screw trough that are alternately arranged, the tube and the screwing connection end being arranged to be substantially perpendicular to each other.

6. The building block structure according to claim 5, wherein the through bore of the tube of said direction-changed tube-conjoined two-end joint adaptor is sized to receive insertion of the screwing connection end therein to form a pivotal joint which provides relative rotatability.

7. The building block structure according to claim 1, wherein the joint adaptor unit further comprises at least one tube-attached inclined one-end joint adaptor, wherein: the tube-attached inclined one-end joint adaptor comprises a tube that comprises a through bore and an outer circumferential surface on which a screwing connection end is formed, the screwing connection end comprising a right/left-hand combined threaded hole, the right/left-hand combined threaded hole comprising at least one right-handed screw trough and at least one left-handed screw trough that are alternately arranged, the tube and the screwing connection end being arranged to be inclined with respect to each other.

8. A building block structure, comprising a joint adaptor unit and at least one connection bar, the joint adaptor unit comprising at least one joint adaptor, the at least one joint adaptor comprising at least one screwing connection end, the at least one screwing connection end comprising a right/left-hand combined threaded hole formed therein, the right/left-hand combined threaded hole being formed by alternate arranging at least one right-handed screw trough and at least one left-handed screw trough, the connection bar having one end that comprises at least one spaced right-handed external thread and an opposite end that comprises at least one spaced left-handed external thread; wherein the joint adaptor unit further comprises at least one tube-attached coaxial two-end joint adaptor, at least one tube-attached right-angled two-end joint adaptor, at least one tube-attached T-shaped three-end joint adaptor, and at least one plug-form one-end joint adaptor, wherein:
the tube-attached coaxial two-end joint adaptor comprises a tube that has a through bore and an outer circumferential surface having opposite sides to each of which a screwing connection end is formed, the screwing connection end comprising a right/left-hand combined threaded hole, the right/left-hand combined threaded hole comprising at least one right-handed screw trough and one or multiple left-handed screw troughs that are alternately arranged;
the tube-attached right-angled two-end joint adaptor comprises a tube that has a through bore and an outer circumferential surface having two sides that are spaced from each other by a right angle and each comprises a screwing connection end mounted thereto, the screwing connection end comprising a right/left-hand combined threaded hole, the right/left-hand combined threaded hole comprising at least one right-handed screw trough and at least one left-handed screw trough that are alternately arranged;
the tube-attached T-shaped three-end joint adaptor comprises a tube that has a through bore and an outer circumferential surface to which three screwing connection ends are mounted, each of the screwing connection ends comprising a right/left-hand combined threaded hole, the right/left-hand combined threaded hole comprising at least one right-handed screw trough and at least one left-handed screw trough that are alternately arranged; and
the plug-form one-end joint adaptor has an end that forms a screwing connection end and an opposite that is an arc-shaped closed end, the screwing connection end comprising a right/left-hand combined threaded hole, the right/left-hand combined threaded hole comprising at least one right-handed screw trough and at least one left-handed screw trough that are alternately arranged.

9. The building block structure according to claim 8, wherein the connection bar has a middle portion that has an outside diameter that is substantially identical to an outside diameter of the screwing connection ends.

10. The building block structure according to claim 8, wherein each of the right-handed screw trough and left-handed screw trough has a helical length that is greater than or substantially equal to a length of a semi-circumferential length of the right/left-hand combined threaded hole and each of the right-handed external thread and left-handed external thread has a helical length that is greater than or substantially equal to a length of a semi-circumferential length of the right/left-hand combined threaded hole.

11. A building block structure, comprising a joint adaptor unit and at least one connection bar, the joint adaptor unit comprising at least one joint adaptor, the at least one joint adaptor comprising at least one screwing connection end, the at least one screwing connection end comprising a right/left-hand combined threaded hole formed therein, the right/left-hand combined threaded hole being formed by alternate arranging at least one right-handed screw trough and at least one left-handed screw trough, the connection bar having one end that comprises at least one spaced right-handed external thread and an opposite end that comprises at least one spaced left-handed external thread; wherein the joint adaptor unit further comprises at least one tube-attached cruciform four-end joint adaptor, wherein:
the tube-attached cruciform four-end joint adaptor comprises a tube that has a through bore and an outer circumferential surface to which four screwing connection ends are mounted, the screwing connection ends being arranged to define a right angle between adjacent ones thereof, each of the screwing connection ends comprising a right/left-hand combined threaded hole, the right/left-hand combined threaded hole comprising at least one right-handed screw trough and at least one left-handed screw trough that are alternately arranged.

12. The building block structure according to claim 11, wherein the connection bar has a middle portion that has an outside diameter that is substantially identical to an outside diameter of the screwing connection end of the at least one joint adaptor.

13. The building block structure according to claim 11, wherein each of the right-handed screw trough and left-handed screw trough has a helical length that is greater than or substantially equal to a length of a semi-circumferential length of the right/left-hand combined threaded hole and each of the right-handed external thread and left-handed external thread has a helical length that is greater than or substantially equal to a length of a semi-circumferential length of the right/left-hand combined threaded hole.

14. The building block structure according to claim 11, wherein the joint adaptor unit further comprises at least one tube-attached right-angled two-end joint adaptor, at least one plug-form one-end joint adaptor, at least one right-angled C-clip one-end joint adaptor, and at least one inclined C-clip one-end joint adaptor, wherein: the at least one tube-attached right-angled two-end joint adaptor comprises a tube that has a through bore and an outer circumferential surface having two sides that are spaced from each other by a right angle and each comprises a screwing connection end mounted thereto and having a right/left-hand combined threaded hole, the right/left-hand combined threaded hole comprising at least one right-handed screw trough and at least one left-handed screw trough that are alternately arranged; the plug-form one-end joint adaptor has an end that forms a screwing connection end and an opposite that is an arc-shaped closed end, the screwing connection end comprising a right/left-hand combined threaded hole, the right/left-hand combined threaded hole comprising at least one right-handed screw trough and at least one left-handed screw trough that are alternately arranged; the right-angled C-clip one-end joint adaptor comprises a C-shaped clip having a side surface on which a screwing connection end is formed, the screwing connection end comprising a right/left-hand combined threaded hole, the right/left-hand combined threaded hole comprising at least one right-handed screw and at least one left-handed screw trough that are alternately arranged, the C-shaped clip and the screwing connection end being arranged to be substantially perpendicular to each other; and the inclined C-clip one-end joint adaptor comprises a C-shaped clip having a side surface on which a screwing connection end is formed, the screwing connection end comprising a right/left-hand combined threaded hole, the right/left-hand combined threaded hole comprising at least one right-handed screw trough and at least one left-handed screw trough that are alternately arranged, the C-shaped clip and the screwing connection end being arranged to be inclined with respect to each other.

15. The building block structure according to claim 11, wherein the joint adaptor unit further comprises at least one conjoint parallel four-end joint adaptor, at least one direction-changed tube-conjoined two-end joint adaptor, at least one plug-form one-end joint adaptor, and at least one tube-attached right-angled one-end joint adaptor, wherein: the conjoint parallel four-end joint adaptor comprises a connection plate having a surface on which two spaced and substantially parallel coaxial two-end joint adaptors are mounted, each of the coaxial two-end joint adaptors having two ends each forming a screwing connection end, the screwing connection end comprising a right/left-hand combined threaded hole, the right/left-hand combined threaded hole comprising at least one right-handed screw trough and at least one left-handed screw trough that are alternately arranged; the direction-changed tube-conjoined two-end joint adaptor comprises a connection plate having a surface on which a coaxial two-end joint adaptor and a tube are mounted, the coaxial two-end joint adaptor having two ends each forming a screwing connection end, the screwing connection comprising a right/left-hand combined threaded hole, the right/left-hand combined threaded hole comprising at least one right-handed screw trough and at least one left-handed screw trough that are alternately arranged, the tube comprising a through bore formed therein and extending through opposite ends thereof, the coaxial two-end joint adaptor and the tube being arranged to be substantially perpendicular to each other; the plug-form one-end joint adaptor has an end that forms a screwing connection end and an opposite that is an arc-shaped closed end, the screwing connection end comprising a right/left-hand combined threaded hole, the right/left-hand combined threaded hole comprising at least one right-handed screw trough and at least one left-handed screw trough that are alternately arranged; and the tube-attached right-angled one-end joint adaptor comprises a tube that comprises a through bore and an outer circumferential surface on which a screwing connection end is formed, the screwing connection end comprising a right/left-hand combined threaded hole, the right/left-hand combined threaded hole comprising at least one right-handed screw trough and at least one left-handed screw trough that are alternately arranged, the tube and the screwing connection end being arranged to be substantially perpendicular to each other.

16. The building block structure according to claim 15, wherein the through bore of the tube of said direction-changed tube-conjoined two-end joint adaptor is sized to receive insertion of the screwing connection end therein to form a pivotal joint which provides relative rotatability.

17. The building block structure according to claim 11, wherein the joint adaptor unit further comprises at least one tube-attached inclined one-end joint adaptor, wherein: the tube-attached inclined one-end joint adaptor comprises a tube that comprises a through bore and an outer circumferential surface on which a screwing connection end is formed, the screwing connection end comprising a right/left-hand combined threaded hole, the right/left-hand combined threaded hole comprising at least one right-handed screw trough and at least one left-handed screw trough that are alternately arranged, the tube and the screwing connection end being arranged to be inclined with respect to each other.

\* \* \* \* \*